United States Patent [19]

Schätzler

[11] 4,073,536
[45] Feb. 14, 1978

[54] MOTOR VEHICLE ROOF

[75] Inventor: Walter Schätzler, Aufhausen, Germany

[73] Assignee: Webasto-Werk W. Baier GmbH & Co., Stockdorf, Germany

[21] Appl. No.: 753,307

[22] Filed: Dec. 22, 1976

[30] Foreign Application Priority Data

Dec. 24, 1975 Germany .............................. 2558764

[51] Int. Cl.² .............................................. B60J 7/04
[52] U.S. Cl. .............................................. 296/137 G
[58] Field of Search .......... 296/137 G, 137 E, 137 M; 74/435, 527, 143, 139

[56] References Cited

U.S. PATENT DOCUMENTS

| | | | |
|---|---|---|---|
| 3,075,807 | 1/1963 | Werner | 296/137 G |
| 3,148,913 | 9/1954 | Golde | 296/137 G |
| 3,788,160 | 1/1974 | Sielk | 296/137 G |
| 3,976,325 | 8/1976 | Schatzler | 296/137 G |
| 4,023,858 | 5/1977 | Bienert | 296/137 G |

*Primary Examiner*—Robert R. Song
*Attorney, Agent, or Firm*—Craig & Antonelli

[57] ABSTRACT

A ratchet wheel and resiliently biased stop member arrangement is provided for limiting movement of a movable roof panel member as it travels between respective closed, tilted, and lowered slidably retracted positions. The ratchet wheel is provided with recesses disposed at respective circumferential positions corresponding to predetermined positions of the roof panel member. The resiliently biased members are engageable in these recesses to retain the ratchet wheel at respective predetermined positions such as corresponding to the closed position of the roof panel member, whereby the operator can easily sense the position of the roof member due to the increased resistance caused by the stop member. The stop members and their springs are configured so as to permit overriding of the stop member so that the operator can move the roof panel member away from the respective positions by merely applying additional force to overcome the spring force at the stop member. Preferred embodiments also include a stepping gear arrangement for optimizing the gear ratio in connection with the ratchet wheel while minimizing the forces applied thereto.

31 Claims, 11 Drawing Figures

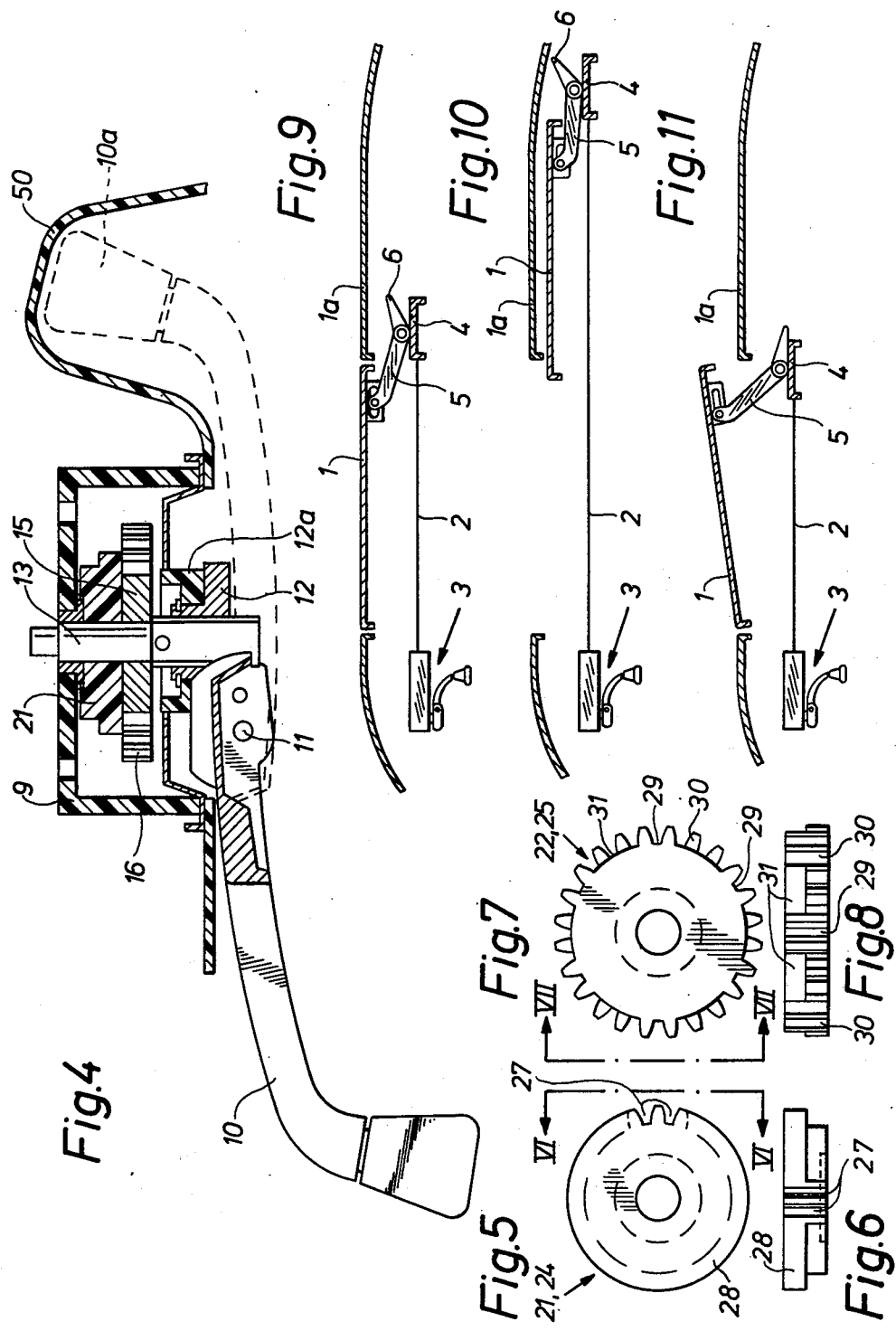

MOTOR VEHICLE ROOF

BACKGROUND AND SUMMARY OF THE INVENTION

The present invention relates to tiltable slidable vehicle panel members. Preferred embodiments of the invention relate to tiltable, slidable vehicle roof panel members (i.e., vehicle roofs having an aperture closable by a sliding panel pivotable upwardly to extend from the fixed part of the roof in an "inclined" position and alternatively slidable below the fixed part of the roof to a "withdrawn" position) of the kind having a crank device mechanism comprising a rotatable crank drivingly connected with said panel to move the panel between said inclined and withdrawn positions via the closed position and being connected via a gear with a ratchet wheel cooperating with stop means to restrain rotation of the crank when the panel is in its closed position. Said roofs are referred to hereinafter as "tiltable sliding roofs of the kind referred to."

In a known tiltable sliding roof of the kind referred to (see German Offenlegeschrift No. 2,231,383) and rachet wheel has two concentric guide slots. A displaceably mounted first pin engages during the withdrawal (i.e., rearward movement) of the panel in one guide slot and is located at one end of said guide slot when the panel is in the closed position. A second pin engages during the opening movement of the roof in the other guide slot and is located at one end of said second guide slot when the roof is returned from its inclined (i.e., tilted) position into the closed position. The two pins are coupled together in such a way that only in the closed position of the roof is it possible for one pin to be removed from the guide slot associated therewith and simultaneously permitting the other pin to be inserted in the guide slot associated therewith. Quite apart from the fact that the arrangement of two guide slots and two pins coupled together by a rocking switch is costly, the main disadvantage of this known mechanism is that the user always has to operate the rocking switch in the closed position of the roof when he wishes to bring the roof from a withdrawn position via the closed position into an inclined position or from an inclined position via the closed position into a withdrawn position, so that one pin is removed from its guide slot and the other pin is inserted in its guide slot. This process can divert the attention of the driver from the road. A further disadvantage of the known mechanism is that the user can overload the mechanism when, in the manner indicated hereinbefore, he attempts to move the roof from a withdrawn position via the closed position into an inclined position or vice versa and without operating the rocking switch with the roof in the closed position, because one end of one of the two link slots forms a rigid stop member with the associated pin with the roof in the closed position. As toothed wheels normally provided in such a mechanism are generally made from plastic for cost and noise reasons, said overloading can cause breaking of teeth.

An object of the invention is to provide a crank drive mechanism for a tiltable sliding roof of the kind referred to which obviates the use of a changeover switch when moving the roof panel from a withdrawn position via the closed position into an inclined position or vice versa and prevents or at least reduces the risk of overloading of the mechanism.

According to the invention, this object is achieved by use of a resilient stop means.

In the tiltable sliding roof according to the invention, the user is made aware of the closed position of the panel through further rotation of the crank arm encountering increased resistance which is brought about in that the resilient stop means cooperates with the ratchet wheel. However, without any further measure being necessary, the user can overcome this resistance by continuing to turn the crank with a corresponding expenditure of energy, resulting in the roof being inclined or withdrawn from the closed position. Due to the resilience of the stop means, it is impossible for the user to exert a force on the mechanism which could lead to damage or destruction of parts thereof. The proposed mechanism also has a much simpler construction than the known apparatus.

The stop means preferably comprises an arresting element which in the closed position of the roof panel engages in a recess on the ratchet wheel under a resilient bias of a spring. On moving the roof panel from a closed position and in response to the resulting rotation of the ratchet wheel, the arresting element is forced out of the recess against the resilient bias of the spring and rides on the rotating ratchet wheel until it can again engage in a recess in the closed position of the roof. The force with which the arresting element is pressed against the ratchet wheel by the spring increases friction and leads to difficult operation. To obviate this, according to a feature of preferred embodiments of the invention, the path on which the arresting element rides when rotating the ratchet wheel is set back relative to the recess, so that the spring which presses the arresting element against the ratchet wheel is more relieved if the arresting element runs on the path outside the recess than when the arresting element is engaged in the recess. Alternative preferred embodiments are constructed so the path has a projection before and after the recess which must be overcome by pressing back the arresting element against the action of the spring before said arresting element can be engaged in or disengaged from the recess. Finally, according to other contemplated embodiments, any arresting element can be used whose travel is limited in such a way that it does not come into contact with the ratchet wheel outside the recess.

The recess can be provided on the ratchet wheel periphery but is preferably located in a lateral surface of the ratchet wheel. To reduce contact pressure and to avoid a one-sided loading of the ratchet wheel, it is 2CaO to provide two diametrically opposed recesses on the ratchet wheel to engage respective spring-loaded arresting elements in the closed position of the roof panel. The distribution of the necessary arresting force over two arresting elements reduces the pressure required of each blocking element compared with only one arresting element. As a result, it is possible to use a relatively soft material for the ratchet wheel.

To permit the arresting of the roof in the withdrawn position, the recess can cooperate with an additional arresting element provided at a correspondong location or the arresting element can cooperate with an additional recess arranged at a corresponding point on the ratchet wheel. Therefore, arresting of the roof can take place in the withdrawn position. With the transmission ratio of the gear between the crank arm and the ratchet wheel designed such that the ratchet wheel rotates by an angle of precisely 180° when the roof panel is moved back from the closed into a withdrawn position, resilient arrestment of the roof panel in the withdrawn position is automatically obtained in the case of an arrangement of two diametrically opposed recesses, because in the withdrawn position the ratchet wheel assumes a position in which the two arresting elements can engage in the recesses.

Since for a complete movement sequence of the roof panel from its withdrawn position to its inclined position, a rotation angle of less than 360° is available for the ratchet wheel when there is only one recess and a rotation angle of less than 180° when there are two diametrically opposed recesses, a very large gearing down of, for example 1:36 is to be provided between crank arm and ratchet wheel.

In the case of a normal gear drive, very large circumferential forces occur, which greatly stress the teeth and destroy any rigid stop means, but which can be overcome without significant expenditure of energy by resilient stop means. To ensure that minimum forces occur, in the case of this extra-ordinarily large gearing down, a multistage stepping gear is provided between the crank arm and the ratchet wheel. This type of gear, which is in principle known in the case of counters with more than one place in which after in each case ten revolutions of the toothed wheel, another toothed wheel is turned by one tooth, the transmission ratio required in the present case can be obtained with limited space requirements. Normally, a two-stage stepping gear is sufficient for the necessary transmission ratio, whereby a first indexing wheel is fixed on the shaft driven by the crank arm, a second indexing wheel and a third indexing wheel rotatable therewith are arranged on an intermediate shaft and a fourth indexing wheel is rotatable with the ratchet wheel and arranged on the ratchet wheel shaft, whereby the first and second indexing wheels, as well as the third and fourth indexing wheels have teeth which only mesh over a small rotational angle. To simplify manufacture, the first and third indexing wheels, as well as the second and forth indexing wheels, should be made identical. The use of such a stepping gear is not restricted to the crank drive mechanism used in the present invention, but is also fundamentally conceivable in the case of sliding roof drives in which a large transmission ratio must be provided between a crank arm and a ratchet wheel.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 4 is a sectional view along the line IV—IV of FIG. 1, with the crank arm and boss and connecting roof portions shown;

FIG. 5 is a plan view of a toothed wheel of a stepping gear of the mechanism of FIG. 1;

FIG. 6 is a view of the toothed wheel in the direction of the arrows VI;

FIG. 7 is a plan view of another toothed wheel of the stepping gear which is in engagement with the toothed wheel shown in FIG. 5;

FIG. 8 is a view of the toothed wheel of FIG. 7 in the direction of the arrows VII;

FIG. 9 is a schematic view of a vehicle roof with a tiltable sliding roof panel in its closed position;

FIG. 10 is a view corresponding to FIG. 9, showing the sliding roof panel withdrawn under a fixed part of the vehicle roof, and FIG. 11 is a view corresponding to FIG. 9, showing the sliding roof panel inclined upwardly in the roof opening.

DETAILED DESCRIPTION OF THE DRAWINGS

Figure 3:
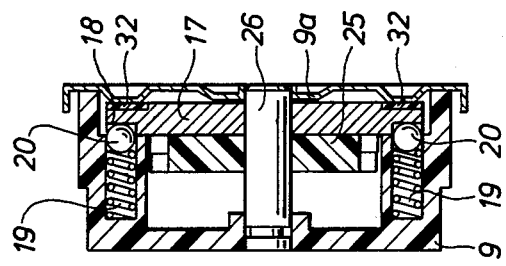
FIG. 3 is a sectional view along the line III—III of FIG. 2.
Figure 2:
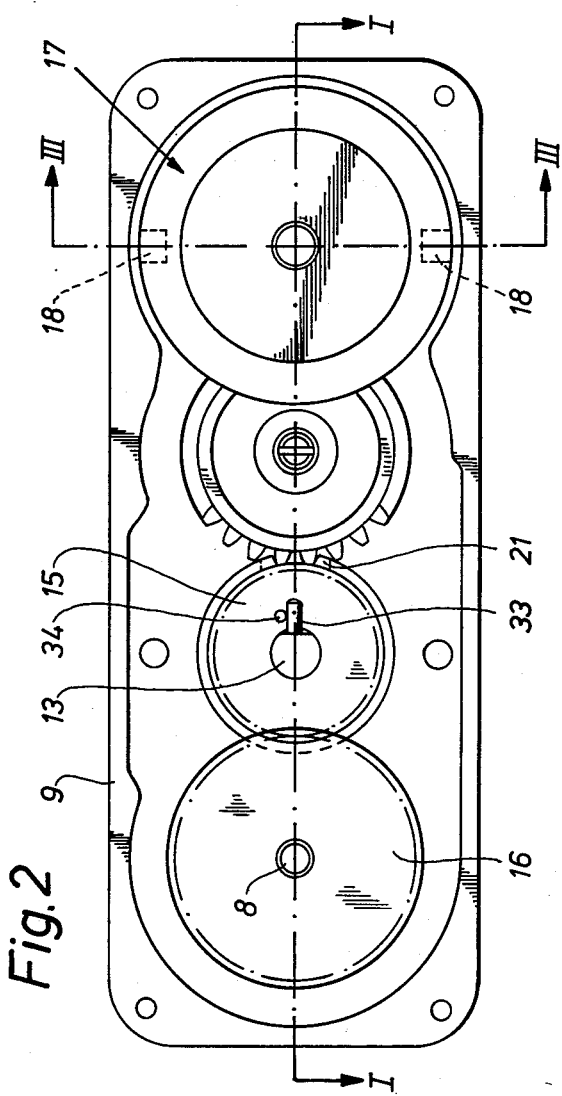
FIG. 2 is a view of the drive mechanism of FIG. 1 from below, with the lower cover plate of the housing omitted.

Referring first to FIGS. 9, 10 and 11, a tiltable sliding roof panel 1 is connected via a cable 2 to a crank drive mechanism 3 by means of which the panel 1 can be moved from a closed position (as shown in FIG. 9) rearwards under a fixed roof part 1a, (as shown in FIG. 10) and can also be brought into an inclined position (as shown in FIG. 11). The cable 2, which is rigid in compression in the represented embodiment, is fixed to a transport bridge 4 carrying a lifting mechanism 5, which is connected to the sliding panel 1 and also is guided at 6 in a link guide (now shown). Openable sliding roofs of this type are known and are described, for example, in German Offenlegeschrift No. 1,933,991. The crank drive mechanism 3 is represented in detail in FIGS. 1 to 4. It has a driving pinion 7, whose external teeth engage with cable 2, and is fixed on a shaft 8 mounted in rotary manner in gear-box 9 fixed to the vehicle roof by conventional means. Pinion 7 is driven by a crank arm 10 (FIG. 4) which is pivoted at 11 to a rotary boss 12, which is in turn fixed on a shaft 13. Shaft 13 is mounted for rotation in gear-box 9 and, via boss 12, in a bearing 12a, which is in turn fixed to gear-box 9. A toothed wheel 15 is rotatable on shaft 13 and meshes with a toothed wheel 16 fixed on the pinion shaft 8. As can be seen in FIG. 4, crank arm 10 can be pivoted in such a way that the crank knob 10a is accommodated into a recess 50 of the inner lining of the roof or into a cover flange.

To obtain restraint of crank arm 10 in the closed position of the sliding panel 1, a ratchet wheel 17 is arranged in gear-box 9 and is connected with crank shaft 13 via a stepping gear designed in this embodiment such that rachet wheel 17 has rotated by almost 180° after about 16 revolutions of crank shaft 13. Ratchet wheel 17 has on its top surface two diametrically opposed recesses 18 engageable by respective arresting elements in the form of a ball 20 loaded by a spring 19 when the sliding roof is in its closed position. It is unimportant whether the closed position is reached by moving the roof from an inclined position or from a withdrawn (i.e., rearward) position with the preferred illustrated embodiment.

The stepping gear comprises a first indexing wheel 21 located on crank shaft 13 for rotation with toothed wheel 15; a second indexing wheel 22 rotatable on a spindle 23; a third indexing wheel 24 rotatable with wheel 22 on spindle 23; and a fourth indexing wheel 25 rotatable with ratchet wheel 17 on spindle 26. The indexing wheels 21 and 24 are identical and are shown in FIGS. 5 and 6. Similarly indexing wheels 22 and 25 are identical with each other and are shown in FIGS. 7 and 8. The indexing wheels 21 and 24 each have two toothed gaps 27, milled into their otherwise smooth edge 28. Indexing wheels 22 and 25 have external teeth comprising six pairs of teeth 29 extending over the entire width of the wheels 22, 25, and alternating with six pairs of teeth 30 extending over only approximately half the width of said wheels (FIG. 8). Over the remaining width, the outer periphery of indexing wheels 22, 25 is set back between two adjacent pairs of teeth 29, as indicated at 31. As indexing wheels 21, 24 have in each case only two toothed gaps 27 and the indexing wheels 22, 25 six pairs of teeth 29, a gearing down ratio of 6:1 is obtained for each pair of wheels 21, 22 or 24, 24 i.e., a total transmission ratio between crank shaft 13 and ratchet wheel 17 of 36:1, the two pairs of indexing wheels being connected in sequence.

If the gear ratio between shaft 13 and ratchet wheel 17 is selected in such a way that said wheel is turned by exactly 180° when the sliding panel 1 is moved from its closed position of FIG. 9 into its withdrawn (i.e., rearward) position of FIG. 10 the balls 20 also engage in recesses 18 in the said withdrawn position of roof 1, thus automatically leading to a stop for crank arm 10 in said withdrawn position.

If the balls 20 are forced out of recesses 18 by rotating ratchet wheel 17, they ride on front face 17a of the said wheel. This front face 17a is set back relative to recesses 18 or at least relative to the projections 18a defining recesses 18, so that the springs 19 are at least partly relaxed and balls 20 press onto the front face 17a with less force. As a result, friction and wear of the path on front face 17a, on which the blocking elements 20 ride is reduced.

Alternatively, instead of balls 20, the blocking elements can be elastic contact pieces known per se, whose outward stroke is so limited by springs that they do not come into contact with ratchet wheel 17 outside the recesses.

Figure 1:
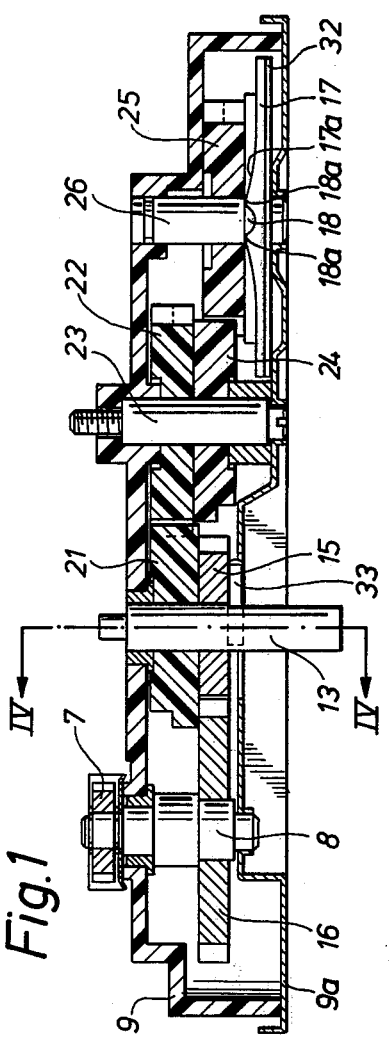
FIG. 1 is a sectional view along the line I—I of FIG. 2, through a crank drive mechanism constructed in accordance with the present invention and showing a lower cover plate in position but with the crank arm and boss removed.

As is seen more particularly in FIGS. 1 and 3, the ratchet wheel 17 is located on the cover 9a which seals gear-box 9. To reduce friction, a plastic ring 32 made from polytetrafluoroethylene or the like can be placed on the bottom of the ratchet wheel.

If the gaps 27 of wheel 21 are not engaged with a pair of teeth 29 of wheel 22, the uninterrupted periphery 28 of wheel 21 is located in a gap 31 between adjacent pairs of teeth 29. This leads to a blocking of wheel 22, the same applying regarding the pair of indexing wheels 24, 25.

Crank shaft 13 is coupled with wheels 21 and 15 arranged thereon via a linkage permitting an idle motion of crank arm 10, in order to permit retraction of crank knob 10a into recess 50 of the roof in substantially any position of panel 1. This linkage comprises a pin 33 projecting laterally from shaft 13 and cooperating with a pin 34 projecting from the bottom of wheel 15. In the position of shaft 13 shown in FIG. 2, this can be rotated in a clockwise direction by about 340° before rotating wheels 15 and 21.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Movable vehicle panel member apparatus comprising:
   a vehicle panel member,
   driving means for tiltingly and slidingly moving said panel member with respect to adjacent vehicle structure,
   a movement control member operatively engageable and movable with said driving means for limiting movement of said panel member as a function of the position of said movement control member,
   and resiliently biased stop means engageable with said movement control member to retain said movement control member in a predetermined control member position corresponding to a predetermined panel member position,
   wherein said stop means is configured and arranged to permit movement of said movement control member from said predetermined control member position in response to application of a predetermined moving force at said driving means which overcome the resilient bias of said stop means.

2. Apparatus according to claim 1, wherein said vehicle panel member is a roof panel member, and wherein said predetermined position corresponds to the closed position of said roof panel member.

3. Apparatus according to claim 1, wherein said movement control member is a rotatably mounted ratchet wheel which is drivingly engageable with rotatable means driven by said driving means.

4. Apparatus according to claim 3, wherein said vehicle panel member is a roof panel member, and wherein said predetermined position corresponds to the closed position of said roof panel member.

5. Apparatus according to claim 4, wherein the stop means comprises an arresting element which resiliently engages in a recess on the ratchet wheel when the roof panel is in the closed position.

6. Apparatus according to claim 5, wherein the recess is arranged in a lateral surface of the ratchet wheel.

7. Apparatus according to claim 5, wherein the ratchet wheel includes a guide path which is set back relative to the recess for accommodating said arresting element during rotation of said ratchet wheel.

8. Apparatus according to claim 6, wherein the ratchet wheel includes a guide path which is set back relative to the recess for accommodating said arresting element during rotation of said ratchet wheel.

9. Apparatus according to claim 5, wherein the ratchet wheel includes a guide path having respective projections in front of and behind the recess, which guide path serves for accommodating said arresting element during rotation of said ratchet wheel.

10. Apparatus according to claim 6, wheren the ratchet wheel includes a guide path having the respective projections in front of and behind the recess, which guide path serves for accommodating said arresting element during rotation of said ratchet wheel.

11. Apparatus according to claim 5, wherein the travel of the arresting element is limited in such a way that it does not come into contact with the ratchet wheel outside the recess or other locating recesses therein.

12. Apparatus according to claim 6, wherein the travel of the arresting elements is limited in such a way that it does not come into contact with the ratchet wheel outside the recess or other locating recesses therein.

13. Apparatus according to claim 4, wherein the stop means are provided for retaining the roof panel in at least one of its withdrawn position and/or its inclined position.

14. Apparatus according to claim 5, wherein two diametrically opposed recesses are provided on the ratchet wheel with each of which recesses is associated with a respective arresting element.

15. Apparatus according to claim 7, wherein two diametrically opposed recesses are provided on the ratchet wheel with each of which recesses is associated with a respective arresting element.

16. Apparatus according to claim 9, wherein two diametrically opposed recesses are provided on the ratchet wheel with each of which recesses is associated with a respective arresting element.

17. Apparatus according to claim 11, wherein two diametrically opposed recesses are provided on the ratchet wheel with each of which recesses is associated with a respective arresting element.

18. Apparatus according to claim 13, wherein the drive means includes a manually operable crank arm for rotating a crank arm gear drivingly connected to move the roof panel, and wherein the gear ratio between the crank arm gear and the ratchet wheel is selected in such a way that the latter rotates by an angle of 180° when the roof is moved from its closed position into its withdrawn position.

19. Apparatus according to claim 14, wherein the drive means includes a manually operable crank arm for rotating a crank arm gear drivingly connected to move the roof panel, and wherein the gear ratio between the crank arm gear and the ratchet wheel is selected in such a way that the latter rotates by an angle of 180° when the roof is moved from its closed position into its withdrawn position.

20. Apparatus according to claim 18, wherein a multistage stepping gear is provided to drive the ratchet wheel from the shaft driven by the crank arm.

21. Apparatus according to claim 19, wherein a multistage stepping gear is provided to drive the ratchet wheel from the shaft driven by the crank arm.

22. Apparatus according to claim 4, wherein the drive means includes a manually operable crank arm for rotating a crank arm gear drivingly connected to move the roof panel, and wherein a multistage stepping gear is provided to drive the ratchet wheel from the shaft driven by the crank arm.

23. Apparatus according to claim 22, wherein a first indexing wheel is fixed on said crank shaft, a second indexing wheel and a third indexing wheel rotatable therewith are provided on an intermediate shaft, and a fourth indexing wheel is rotatable with the ratchet wheel and arranged on the shaft of the ratchet wheel, whereby the first and second indexing wheels and the third and fourth indexing wheels have teeth or toothed gaps which engage with one another only over a small rotation angle.

24. Apparatus according to claim 5, wherein a first indexing wheel is fixed on said crank shaft, a second indexing wheel and a third indexing wheel rotatable therewith are provided on an intermediate shaft, and a fourth indexing wheel is rotatable with the ratchet wheel and arranged on the shaft of the ratchet wheel, whereby the first and second indexing wheels and the third and fourth indexing wheels have teeth or toothed gaps which engage with one another only over a small rotation angle.

25. Apparatus according to claim 18, wherein a first indexing wheel is fixed on said crank shaft, a second indexing wheel and a third indexing wheel rotable therewith are provided on an intermediate shaft, and a fourth indexing wheel is rotatable with the ratchet wheel and arranged on the shaft of the ratchet wheel, whereby the first and second indexing wheels and the third and fourth indexing wheels have teeth or toothed gaps which engage with one another only over a small rotation angle.

26. Apparatus according to claim 23, wherein the first and third indexing wheels are identical and the second and fourth indexing wheels are identical.

27. Apparatus according to claim 4, wherein the stop means comprises a ball engageable in a recess in the ratchet wheel and biased into said engagement by a compression spring.

28. Apparatus according to claim 23, wherein the stop means comprises a ball engageable in a recess in the ratchet wheel and biased into said engagement by a compression spring.

29. Apparatus according to claim 4, wherein a friction reducing ring of polytetrafluoroethylene or the like is placed on the bottom of the ratchet wheel.

30. Movable vehicle panel member apparatus comprising:
 a vehicle panel member,
 driving means for tiltingly and slidingly moving said panel member with respect to adjacent vehicle structure, said driving means including a manually openable crankarm fixed to a shaft,
 a movement control member operatingly engageable and movable with said driving means for limiting movement of said panel member as a function of the position of said movement control member,
 said movement control member being a rotatably mounted ratchet wheel which is drivingly engageable with rotatable means driven by said driving means, and
 a multistage step gear for driving the ratchet wheel from the shaft driven by the crank arm, said step gear comprising at least one pair of gears having gears or tooth gaps which engage with one another only over a small rotation angle.

31. Apparatus according to claim 30, wherein a first indexing wheel is fixed on said crank shaft, a second indexing wheel and a third indexing wheel rotatable therewith are provided on an intermediate shaft, and a forth indexing wheel is rotatable with the ratchet wheel and arranged on the shaft of the ratchet wheel, whereby the first and second indexing wheels and the third and fourth indexing wheels have teeth or toothed gaps which engage with one another only over a small rotation angle.

* * * * *